(12) United States Patent  
Possanza et al.

(10) Patent No.: US 6,644,348 B2  
(45) Date of Patent: Nov. 11, 2003

(54) PURGABLE MULTIPORT VALVE

(75) Inventors: Steven D. Possanza, Penfield, NY (US); Angela H. R. Jones, Rochester, NY (US); Brian J. Connolly, Rochester, NY (US); Edgar P. Lougheed, Byron, NY (US)

(73) Assignee: Eastman Kodak Company, Rochester, NY (US)

( * ) Notice: Subject to any disclaimer, the term of this patent is extended or adjusted under 35 U.S.C. 154(b) by 90 days.

(21) Appl. No.: 09/996,653

(22) Filed: Nov. 28, 2001

(65) Prior Publication Data

US 2003/0098075 A1 May 29, 2003

(51) Int. Cl.⁷ .............................................. F16K 11/20
(52) U.S. Cl. ...................................... 137/597; 251/63.6
(58) Field of Search ................................. 137/597, 886; 251/63.6

(56) References Cited

U.S. PATENT DOCUMENTS

| | | | | |
|---|---|---|---|---|
| 4,711,268 A | * | 12/1987 | Coleman | .................... 137/597 |
| 5,209,258 A | * | 5/1993 | Sharp et al. | ................. 137/343 |
| 5,931,192 A | * | 8/1999 | Smith et al. | ........... 137/599.11 |
| 5,988,203 A | * | 11/1999 | Hutton | ........................ 137/271 |
| 6,035,893 A | * | 3/2000 | Ohmi et al. | ................. 137/597 |

* cited by examiner

Primary Examiner—Stephen M. Hepperle  
(74) Attorney, Agent, or Firm—Mark G. Bocchetti (57) ABSTRACT

A multiport valve is taught for regulating flow of liquid therethrough originating from at least two sources. The valve includes a three cylindrical valve chambers each having a piston residing therein such that through actuation of the pistons flow through each valve chamber can be permitted or stopped independently. There is an inlet port that tangentially intercepts the first cylindrical valve chamber and there is an outlet port that tangentially intercepts an intermediate cylindrical valve chamber. The design of the three valve chambers and the inlet and outlet ports to the valve chambers effectively eliminates any bubble traps in the valve and allows bubbles to be swept from the valve chambers.

16 Claims, 6 Drawing Sheets

PURGABLE MULTIPORT VALVE

FIELD OF THE INVENTION

The present invention relates generally to valves for regulating the flow of fluids and, more particularly, to multiport valves for controlling flow of fluids from at least two sources to at least two destinations.

BACKGROUND OF THE INVENTION

In the manufacture of coated web substrates, for example photographic films and papers, a liquid composition is coated via a specialized coating apparatus, typically a coating die or hopper, onto a moving web substrate. The composition, which may be one of several being coated simultaneously through the same hopper, is delivered to the hopper from a holding vessel via a solution delivery system. Current solution delivery systems in the photographic industry are highly automated and include a number of specialized valves for performing specific functions including, for example, changing flows between vessels, changing inline filters, purging of entrained air from the components of the system, and delivering coating compositions and flush water to the coating hopper.

Bubbles in solution (in the form of entrained air) are a reality of the modem high speed methods to coat complex photographic films in papers. If not removed prior to coating, bubbles are a major source of machine down time and coated waste. A single bubble, 30 microns or larger can cause a coating defect and must be avoided. Bubbles may be introduced into coating solutions in many ways. Bubbles may be directly introduced as a result of voids or air pockets created in various system components. Bubbles may be the result of entrained gases present in the liquids flowing through the system. Bubbles may further be the result of dissolved gases released as components of the coating solutions are "melted" from the solid to the liquid state. As a result, bubbles must be effectively removed from the coating system to reduce coating waste.

Bubbles are initially removed and minimized by known deaeration processes. Once the bubbles are removed from the coating solution, the coating solution delivery system is prepared. The solution delivery system (SDS) (lines and components) are prepared by first filling the system with deaerated high purity water at 40° C. This water fill step is designed to eliminate all air and bubbles from the SDS. In the next step, the water is displaced (purged) by bubble free coating solution. However, SDS components, particularly the valves, can be difficult to purge. Dead legs, threads, cracks, and valve cavities can all produce bubble traps that eventually release bubbles during the coating operation (as a result of a flow rate change, some other upset, or just by chance).

Commercially available valves (ball valves, etc.) typically have many internal areas such as crevices, pipe threads, passageways, and valve chambers wherein air can be trapped and fail to be purged during a purge cycle with flush water. In addition, commercially available valves do not have all of the routing features needed for delivering both coating compositions and flush water to a coating apparatus. In particular, commercially available valves do not allow for purging of coating solution from the SDS to drain, while the coating hopper is draining or flushing independently of the SDS.

SUMMARY OF THE INVENTION

It is therefore an object of the invention to provide an improved multiport valve wherein the potential for the trapping of air leading to the formation of bubbles is reduced.

It is a further object of the invention to provide an improved multiport valve wherein residual coating composition may be readily removed by flush water.

It is still a further object of the invention to provide an improved multiport coat select valve wherein the solution delivery system may be purged to drain while a connected hopper is draining or being flushed independent of the solution delivery system.

Briefly stated, these and numerous other features, objects, and advantages of the present invention will become readily apparent upon a reading of the detailed description, claims and drawings set forth herein. These features, objects, and advantages are accomplished by a multiport valve for regulating flow of liquid therethrough originating from at least two sources comprising:

a first cylindrical valve chamber having a first inlet port and a first outlet port, the first inlet port tangentially intercepting the first cylindrical valve chamber;

a first piston residing in the first cylindrical valve chamber, the first piston being movable to engage and disengage with a first valve seat located at the first outlet port;

a second cylindrical valve chamber having a second inlet port and a second outlet port;

a second piston residing in the second cylindrical valve chamber, the second piston being movable to engage and disengage with a second valve seat located at the second inlet port;

a primary liquid inlet port for delivering liquid to an internal conduit, the internal conduit connecting with and being coaxial with the second inlet port, the internal conduit also connecting with and being coaxial with a alternative inlet port in an intermediate cylindrical valve chamber, the intermediate cylindrical valve chamber having a third inlet port and a third outlet port, the third inlet port being connected to and coaxial with the first outlet port, the third outlet port tangentially intercepting the intermediate cylindrical valve chamber; and a third piston residing in the intermediate cylindrical valve chamber, the third piston being movable to engage and disengage with a third valve seat located at the alternative inlet port.

The multiport valve of the present invention is preferably oriented such that the third outlet port is substantially horizontal and tangentially intercepts the intermediate cylindrical valve chamber at a top surface thereof. Each of the valve seats are positioned in a respective end wall of the cylindrical valve chambers. The transition from cylindrical wall to end wall should be radiused.

The first inlet port, tangentially intercepting the first cylindrical valve chamber, creates a swirling or sweeping flow path through the first cylindrical valve chamber allowing bubbles to be swept therefrom. Similarly, the third outlet port, tangentially intercepting the intermediate cylindrical valve chamber, creates a swirling or sweeping flow path through the intermediate cylindrical valve chamber allowing bubbles to be swept therefrom. In addition, the tangential connections aid in avoiding bubble traps in the valve chambers.

It is preferred that each of the pistons is independently controlled and actuated. This allows for selection of flow path therethrough originating from one of two sources and transmitted to one of two destinations.

DETAILED DESCRIPTION OF THE INVENTION

Figure 1:
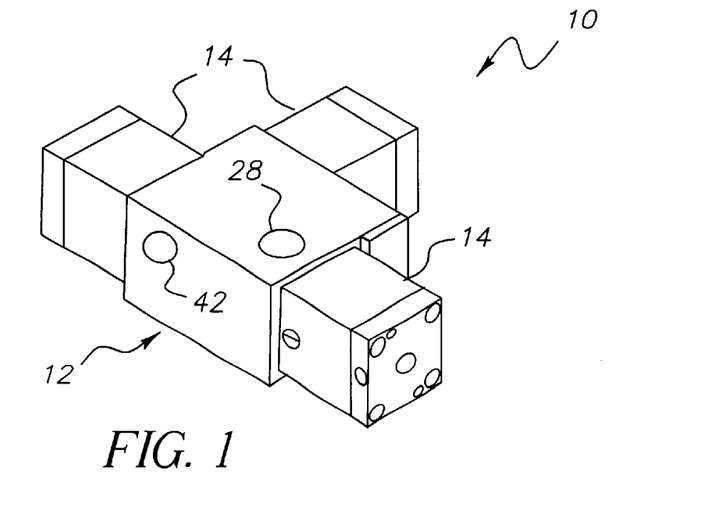
FIG. 1 is a perspective view of the multiport valve with actuators attached thereto.
Figure 2:
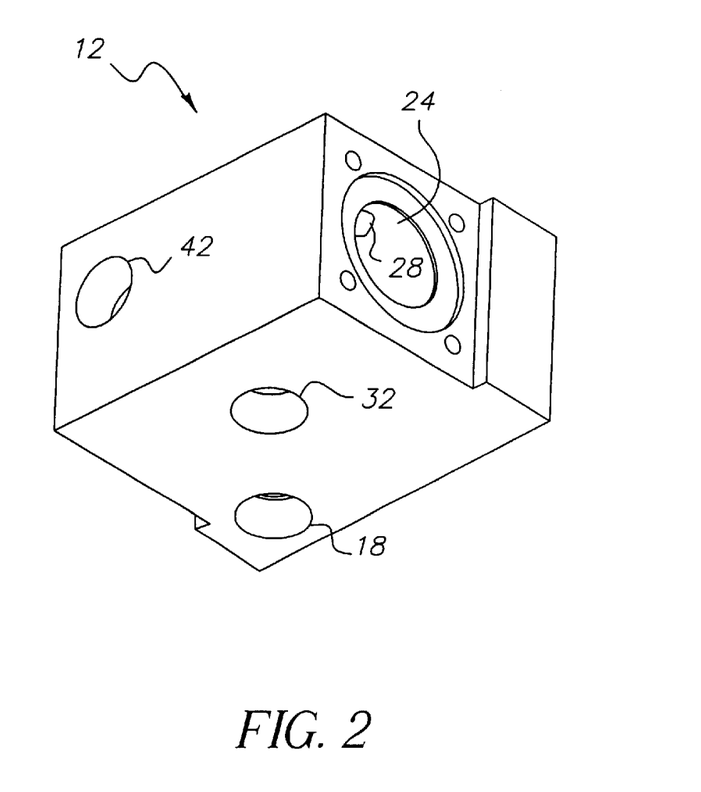
FIG. 2 is a perspective view of the multiport valve body without the actuators attached thereto.
Figure 3:
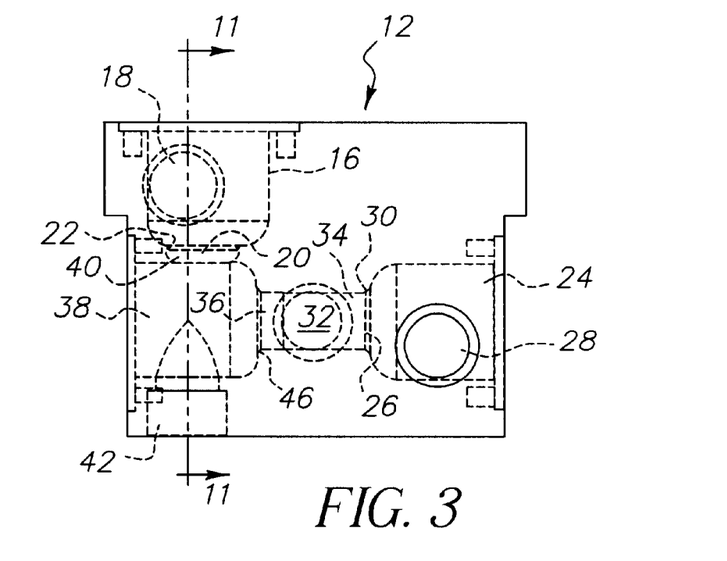
FIG. 3 is a top view of the valve body shown in FIG. 2.
Figure 4:
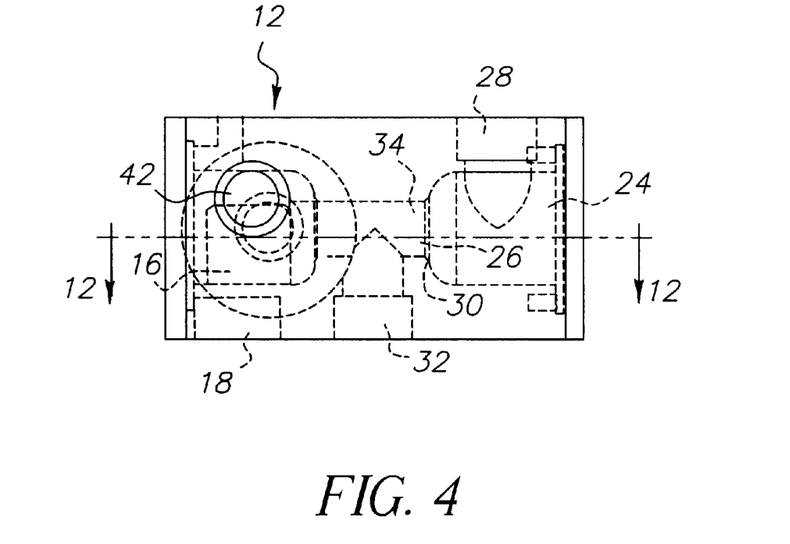
FIG. 4 is a front view of the valve body shown in FIG. 2.
Figure 5:
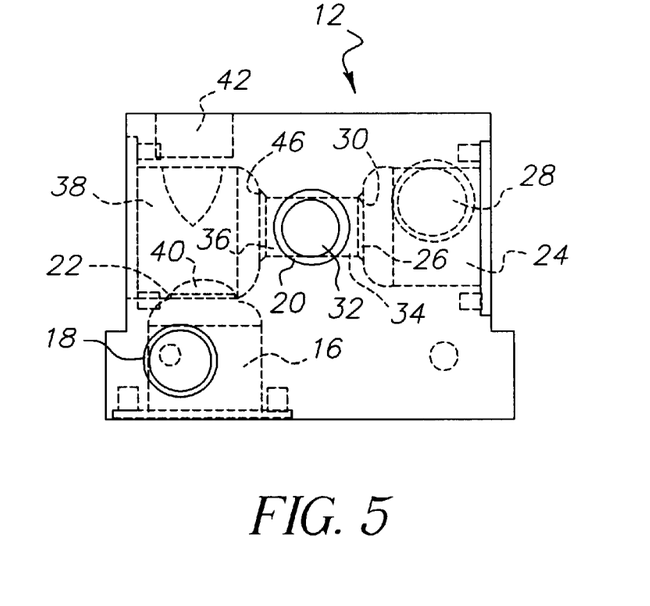
FIG. 5 is a bottom view of the valve body shown in FIG. 2.
Figure 6:
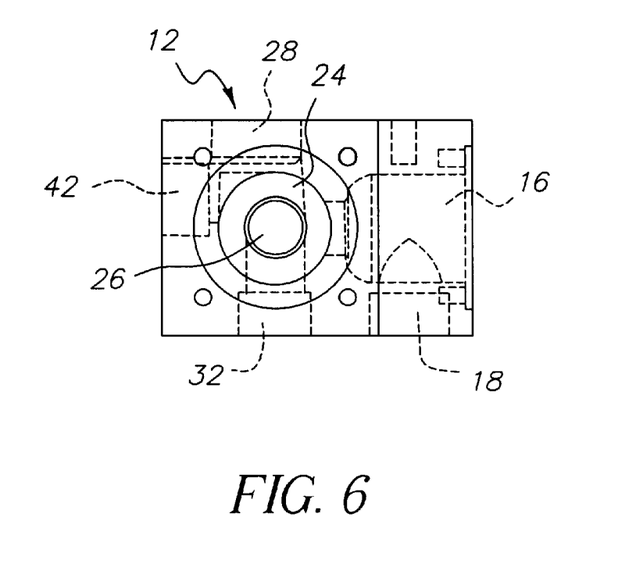
FIG. 6 is a right end view of the valve body shown in FIG. 2.

Turning first to FIGS. 1 through 6 there is shown the multiport valve 10 of the present invention. The multiport valve 10 includes a valve body 12 and is shown in FIG. 1 with three actuators 14 mounted thereto. Valve body 12 (see FIGS. 2–6, 11, 12) is preferably formed by machining from a single blank, for example, stainless steel, titanium aluminum alloy, or plastic. Thus, valve body 12 is one integrally fabricated component.

There is a first cylindrical valve chamber 16 formed in valve body 12 having a first inlet port 18 and a first outlet port 20. The first inlet port 18 tangentially intercepting the first cylindrical valve chamber 16. There is a first valve seat 22 located at the first outlet port 20.

There is a second cylindrical valve chamber 24 formed in valve body 12 having a second inlet port 26 and a second outlet port 28. The second inlet port 26 may tangentially intercept the second cylindrical valve chamber 24. There is a second valve seat 30 located at the second inlet port 26.

Valve body 12 further includes a primary liquid inlet port 32 for delivering liquid to an internal conduit 34 formed in valve body 12. Internal conduit 34 connects with and is coaxial with the second inlet port 26. The internal conduit 34 also connects with and is coaxial with a alternative inlet port 36 accessing an intermediate cylindrical valve chamber 38. The intermediate cylindrical valve chamber 38 has a third inlet port 40 and a third outlet port 42, the third inlet port 40 being connected to and coaxial with the first outlet port 20. The third outlet port 42 tangentially intercepts the intermediate cylindrical valve chamber 38. There is a third valve seat 46 located at the alternative inlet port 36.

Figure 7:
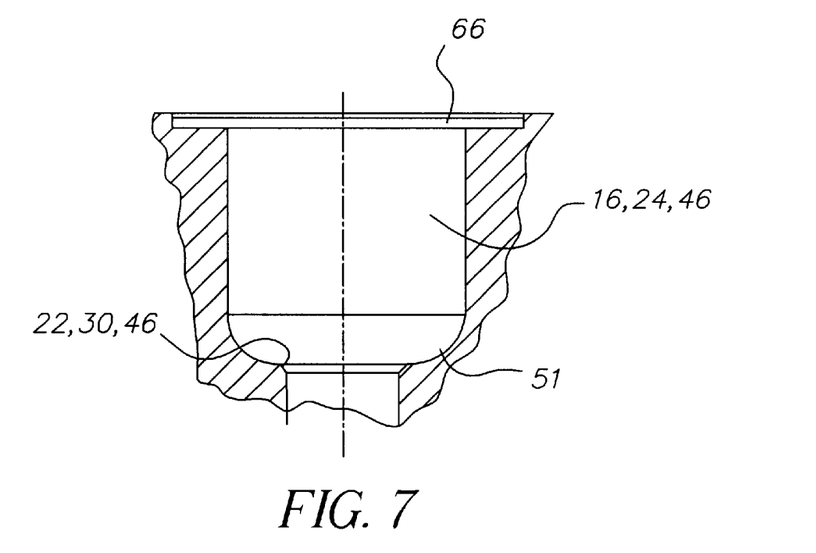
FIG. 7 is an exemplary cross-sectional view of a cylindrical valve chamber.
Figure 8:
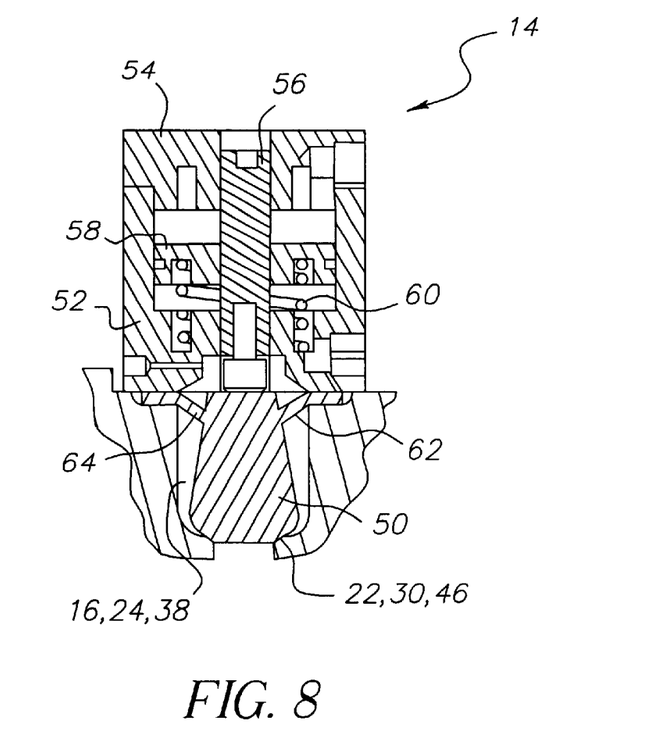
FIG. 8 is an exemplary cross sectional view of a valve chamber with an actuator mounted thereon and a valve piston extending into the valve chamber.

Looking next at FIGS. 7 and 8 there is shown an exemplary cross-sectional view of the three cylindrical valve chambers 16, 24, 38. FIG. 8 includes an exemplary actuator 14 mounted above the cylindrical valve chamber. A respective piston 50 resides in each of the three cylindrical valve chambers 16, 24, 38. Each of the respective pistons 50 is movable to engage with and disengage from a respective valve seat 22, 30, 46 thereby allowing ports 20, 26, 36 to be opened and/or closed through actuation of pistons 50. Each of the valve seats 22, 30, 46 is positioned in a respective end wall of the cylindrical valve chamber. The transition from cylindrical wall to end wall should be radiused to present a smooth curved surface 51 thereby avoiding potential bubble traps.

Each actuator 14 is preferably a pneumatic or hydraulic type actuator as are well known in the art. Each actuator 14 includes a housing element 52 with a cover element 54. Slidably residing in each housing element is a shaft 56. Shaft 56 is generally coaxial with and connected to piston 50 such as by a mandrel extending from shaft 56 which threadably engages piston 50. Affixed to shaft 56 is a drive piston 58. Drive piston 58 can be driven up or down within housing element 52 by providing pneumatic or hydraulic pressure to either side of drive piston 58. In such manner, each piston 50 can be driven into engagement with and disengagement from a respective valve seat 22, 30, 46. There is a spring 60 in each housing element 52 normally biasing drive piston 58 and piston 50 away from a respective valve seat. As shown, each of pistons 50 preferably includes an elastomeric diaphragm 62 which permits piston 50 from being reciprocated within a cylindrical valve chamber between open and closed positions. Elastomeric diaphragm 62 includes a flange portion 64 which resides in annular recess 66. Thus, elastomeric diaphragm 62 with flange portion 64 provides a seal between housing element 52 and the valve chamber 16, 24, 38. Each respective valve actuator 14 is preferably independently controllable for actuating each of the three pistons 50.

To allow for the most efficient purging of bubbles from multiport valve 10, it is preferable that multiport valve 10 be oriented such that the third outlet port 42 is substantially horizontal and tangentially intercepts the intermediate cylindrical valve chamber 38 at a top surface thereof Further, it is preferable that multiport valve 10 be oriented such that the second outlet port 28 is located on the top surface of the valve body 12. When so oriented, coating solutions always flow up through valve 10.

Figure 9:
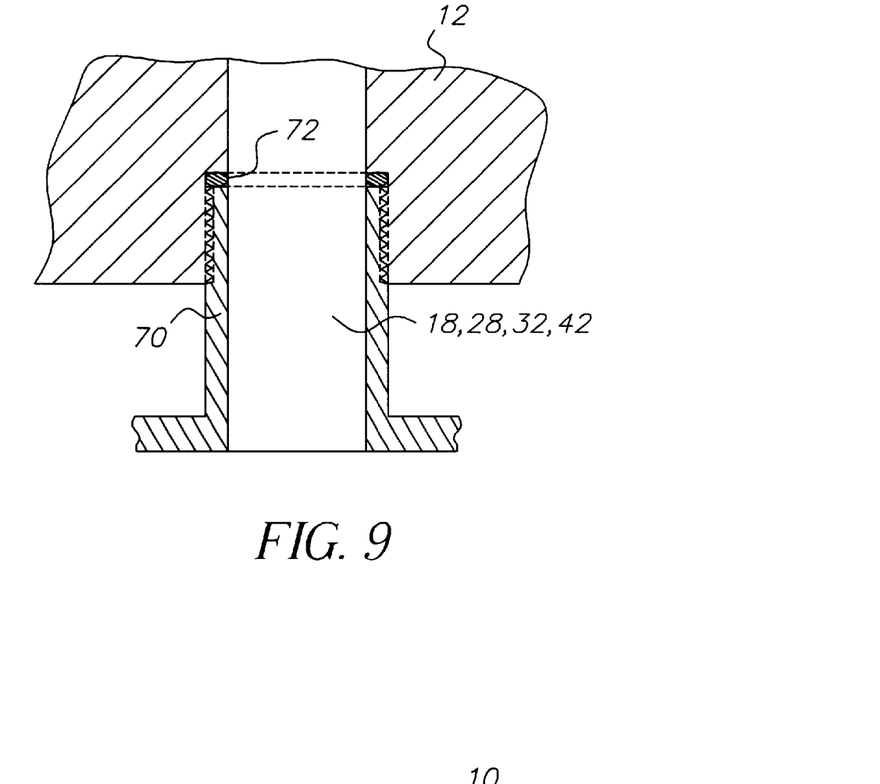
FIG. 9 is a generic cross sectional view showing connection between an external conduit and a port in the valve body.

As discussed above, valve body 12 includes ports 18, 28, 32 and 42. Such ports 18, 28, 32 and 42 are generically depicted in cross-section in FIG. 9 to show that they are preferably internally threaded. In such manner, valve body 12 includes for integrally formed fittings. The internally threaded portion of each port has a larger inside diameter than the inside diameter of the remainder of the port. When properly sized, the threaded conduit or nipple 70 engaged with the threaded portion of the port will have the same inside diameter as a non-threaded portion of the port. In this manner, crevices, large seams, and other discontinuities within the valve body that could undesirably trap air bubbles or residual composition are substantially eliminated. A washer or gasket 72, formed preferably of an incompressible and generally non-reactive substance, resides between the threaded end of the conduit or nipple 70 and the step in the port created by the change in inside diameter from the threaded portion thereof to the non-threaded portion thereof. Washer or gasket 72 should have the same inside diameter as the conduit or nipple 70. By way of example, silver is an excellent material for washer 72 when the valve is used with photographic emulsions.

When used as a valve to supply both coating composition and flush water to coating apparatus, first inlet port 18 is preferably used for flush water inlet, primary liquid inlet port 32 is preferably used for coating composition inlet, second outlet port 28 is preferably used to go to drain, and third outlet port 42 is used for coating composition outlet from the valve 10 to the coating apparatus.

Figure 10:
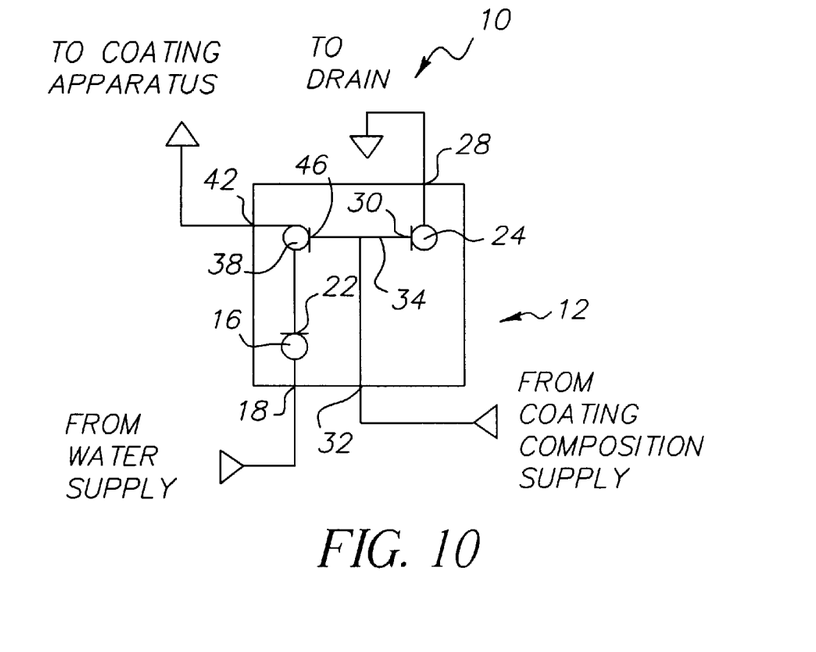
FIG. 10 is a flow schematic of the flow paths through the multi-port valve.
Figure 11:
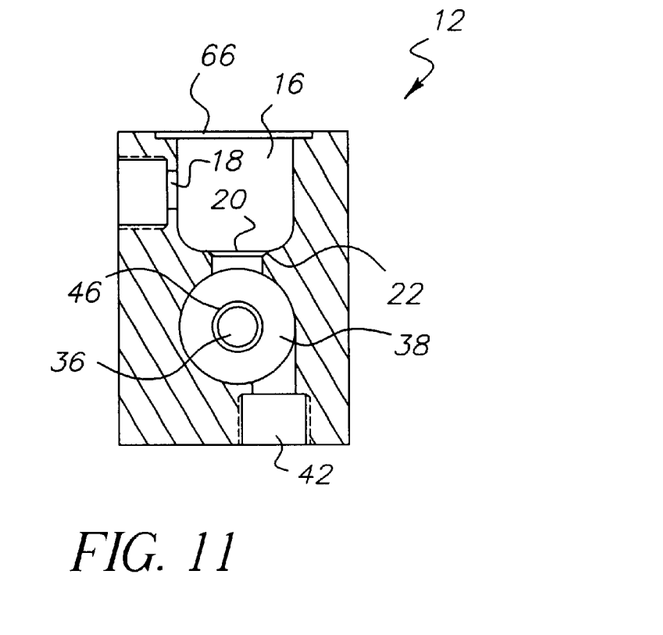
FIG. 11 is a cross-sectional view taken along line 11—11 of FIG. 3.
Figure 12:
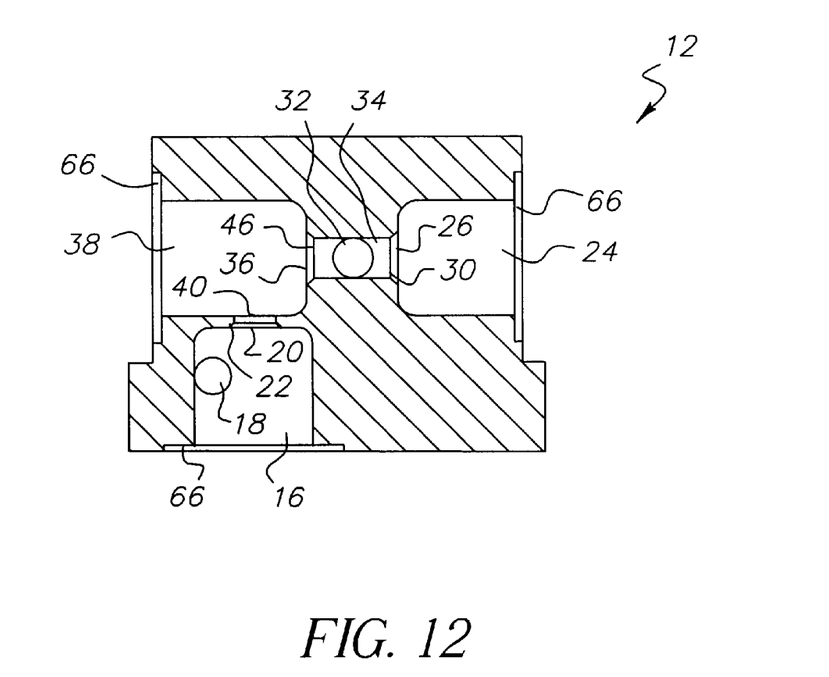
FIG. 12 is a cross-sectional view taken along line 12—12 of FIG. 4.

The flow paths provided through valve 10 may be summarized as with reference to the schematic depiction of multiport valve 10 in FIG. 10. A liquid coating composition to be regulated by valve 10 enters valve body 12 via primary liquid inlet port 32 on the underside of valve body 12 and fills the internal conduit or passageway 34 leading to valve seats 30, 46 of second cylindrical valve chamber 24 and intermediate cylindrical valve chamber 38, respectively. Preferably, the internal conduit or passageway 34 is as short as practically possible to minimize the length of dead leg inherent therein. Water entering valve body 10 via first water inlet port 18 fills first cylindrical valve chamber 16. Water can be flowed from the water supply to the coating apparatus by actuating pistons 50 such that the piston in first cylindrical valve chamber 16 is in the open position and the piston and in the intermediate cylindrical valve chamber 38 is in the closed position. Coating composition can be flowed from coating composition supply to drain by actuating the pistons 50 such that the piston within intermediate cylindrical valve chamber 38 is in the closed position and the piston within second cylindrical valve chamber 24 is in the open position. Coating composition can be flowed from coating composition supply to the coating apparatus by actuating the pistons within second cylindrical valve chamber 24 and intermediate cylindrical valve chamber 38 such that the piston within second cylindrical valve chamber 24 is in the closed position and the piston within intermediate cylindrical valve chamber 38 is in the open position.

As shown and described herein, coating solutions delivered to a coating apparatus via multiport valve 10 are not exposed to any threads. The process ports in valve body 12 are designed to allow a constant diameter through the valve to be maintained with the exception, of course, of the cylindrical valve chambers. The cylindrical valve chambers are designed to allow effective bubble purging. First inlet port 18 and third outlet port 42 tangentially intercept first cylindrical valve chamber 16 and intermediate cylindrical valve chamber 38, respectively, to effectively eliminate any bubble traps in chambers 16, 38 and allowing bubbles to be swept from chambers 16, 38.

From the foregoing it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List

10 Muliport Valve
12 Valve Body
14 Actuators
16 First Cylindrical Valve Chamber
18 First Inlet Port
20 First Outlet Port
22 First Valve Seat
24 Second Cylindrical Valve Chamber
26 Second Inlet Port
28 Second Outlet Port
30 Second Valve seat
32 Primary Liquid Inlet Port
34 Internal Conduit
36 Alternative inlet port
38 Intermediate Cylindrical Valve Chamber
40 Third Inlet Port
42 Third Outlet Port
46 Third Valve Seat
50 Piston
51 Smooth Curved Surface
52 Housing Element
54 Cover Element
56 Shaft
58 Drive Piston
60 Spring
62 Elastomeric Diaphragm
64 Flange Portion
66 Annular Recess
70 Threaded Conduit or Nipple
72 Washer or Gasket

What is claimed is:

1. A multiport valve for regulating flow of liquid therethrough originating from at least two sources comprising:
   a first cylindrical valve chamber having a first inlet port and a first outlet port, the first inlet port tangentially intercepting the first cylindrical valve chamber;
   a first piston residing in the first cylindrical valve chamber, the first piston being movable to engage and disengage with a first valve seat located at the first outlet port;
   a second cylindrical valve chamber having a second inlet port and a second outlet port;
   a second piston residing in the second cylindrical valve chamber, the second piston being movable to engage and disengage with a second valve seat located at the second inlet port;
   a primary liquid inlet port for delivering liquid to an internal conduit, the internal conduit connecting with and being coaxial with the second inlet port, the internal conduit also connecting with and being coaxial with a alternative inlet port in an intermediate cylindrical valve chamber, the intermediate cylindrical valve chamber having a third inlet port and a third outlet port, the third inlet port being connected to and coaxial with the first outlet port, the third outlet port tangentially intercepting the intermediate cylindrical valve chamber; and
   a third piston residing in the intermediate cylindrical valve chamber, the third piston being movable to engage and disengage with a third valve seat located at the alternative inlet port.

2. A multiport valve as recited in claim 1 wherein:
   the multiport valve is oriented such that the third outlet port is substantially horizontal and tangentially intercepts the intermediate cylindrical valve chamber at a top surface thereof.

3. A multiport valve as recited in claim 1 further comprising:
   a respective valve actuator for actuating each of the first, second and third pistons.

4. A multiport valve as recited in claim 3 wherein:
   at least one of the respective valve actuators is pneumatically controlled.

5. A multiport valve as recited in claim 1 further comprising:
   an integrally formed valve body, the first, second and intermediate valve chambers residing therein.

6. A multiport valve as recited in claim 5 further comprising:
   a first integrally formed fitting in the first inlet port.

7. A multiport valve as recited in claim 5 further comprising:

a second integrally formed fitting in the second inlet port.

8. A multiport valve as recited in claim 5 further comprising:

a third integrally formed fitting in the third outlet port.

9. A multiport valve as recited in claim 5 further comprising:

a fourth integrally formed fitting in the primary liquid inlet port.

10. A multiport valve as recited in claim 6 wherein:

the first integrally formed fitting allows for a conduit to be connected thereto wherein the conduit has the same inside diameter as the first inlet port beyond the first integrally formed fitting.

11. A multiport valve as recited in claim 7 wherein:

the second integrally formed fitting allows for a conduit to be connected thereto wherein the conduit has the same inside diameter as the second inlet port beyond the second integrally formed fitting.

12. A multiport valve as recited in claim 8 wherein:

the third integrally formed fitting allows for a conduit to be connected thereto wherein the conduit has the same inside diameter as the third inlet port beyond the third integrally formed fitting.

13. A multiport valve as recited in claim 9 wherein:

the fourth integrally formed fitting allows for a conduit to be connected thereto wherein the conduit has the same inside diameter as the primary liquid inlet port beyond the fourth integrally formed fitting.

14. A multiport valve as recited in claim 3 further comprising:

each respective valve actuator is independently controllable for actuating each of the first, second and third pistons.

15. A multiport valve as recited in claim 1 wherein:

the second outlet port is vertically oriented.

16. A multiport valve as recited in claim 1 wherein:

each of the valve seats is positioned in an end wall of a respective cylindrical valve chamber and there is a transition from a cylindrical wall of the respective cylindrical valve chamber to the end wall thereof that is radiused.

* * * * *